United States Patent [19]

Haake et al.

[11] 4,366,774
[45] Jan. 4, 1983

[54] UNIVERSAL ANIMAL SHELF

[75] Inventors: Lawrence H. Haake, Prairie Village, Kans.; Herschel B. Anderson, Kansas City, Mo.

[73] Assignee: Schroer Manufacturing Co., Kansas City, Mo.

[21] Appl. No.: 280,991

[22] Filed: Jul. 6, 1981

[51] Int. Cl.³ .................. A01K 1/035; A47B 57/00
[52] U.S. Cl. .................. 119/17; 108/143; 211/105.3
[58] Field of Search .................. 119/17, 18, 19; 108/102, 137, 143; 211/105.3, 105.4; 272/62

[56] References Cited

U.S. PATENT DOCUMENTS

| | | | |
|---|---|---|---|
| 2,015,389 | 9/1935 | Whitted | 108/143 |
| 2,790,184 | 4/1957 | Testa | 108/149 X |
| 2,919,134 | 12/1959 | Zuro | 211/105.4 X |
| 3,177,848 | 4/1965 | Rubricus | 119/17 |
| 3,292,582 | 12/1966 | Rubricus | 119/17 |
| 3,698,360 | 10/1972 | Rubricus | 119/17 |
| 3,797,460 | 3/1974 | Blankenship | 119/17 |
| 3,905,333 | 9/1975 | Uhrig | 119/17 |
| 4,155,312 | 5/1979 | Thorkildson | 108/137 |

Primary Examiner—Hugh R. Chamblee
Attorney, Agent, or Firm—Litman, Day & McMahon

[57] ABSTRACT

An adjustable length shelf for a small animal cage having opposite wall members comprises first and second shelf portions which are fitted together in an expansible and contractible telescoping relationship to fit between the opposite wall members of virtually any commonly used veterinary or laboratory animal cage. An adjustment mechanism for forcing the first and second shelf portions apart includes one part mounted on the first shelf portion and a second and coordinating part mounted on the second shelf portion for urging the opposite free ends of the shelf into contact with the cage walls. Opposite end plates are pivotally mounted to the free ends of the shelf for facing engagement with the cage wall members.

6 Claims, 4 Drawing Figures

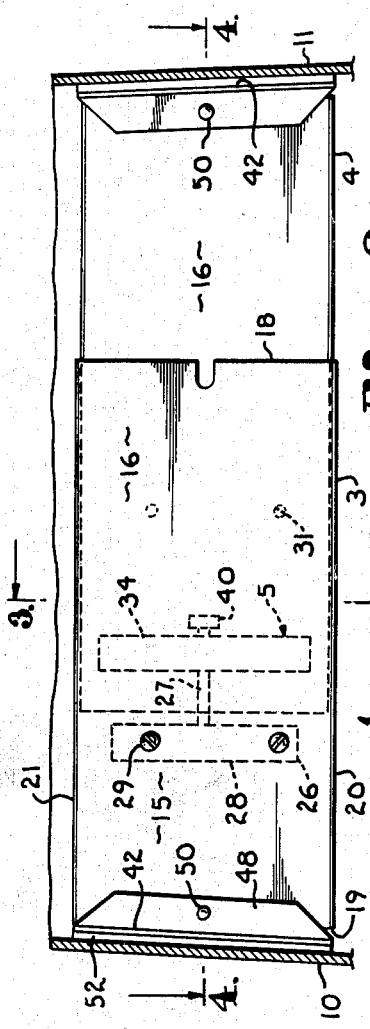
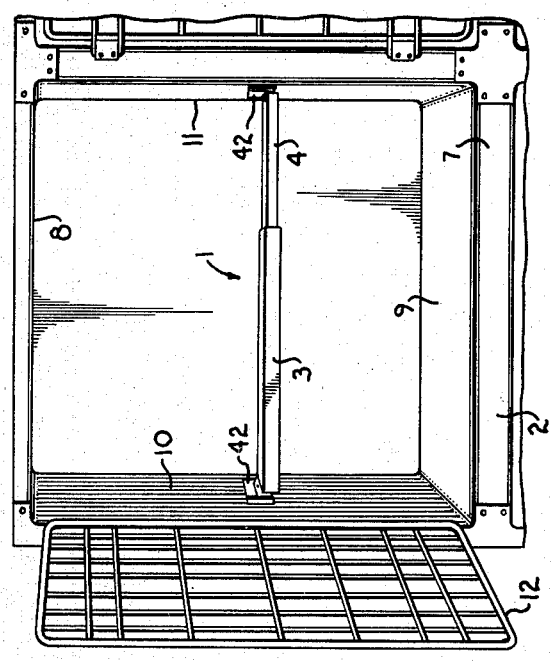
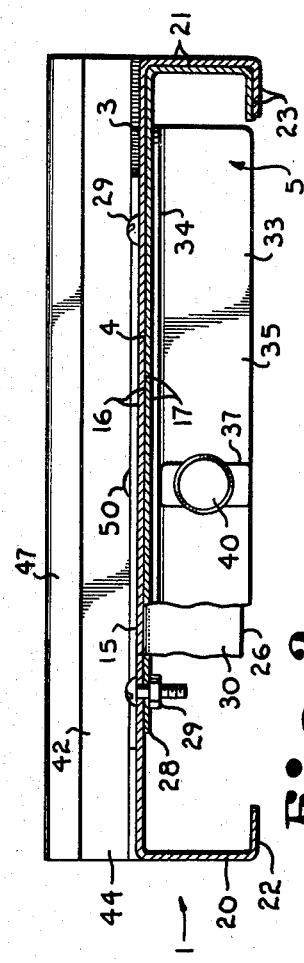
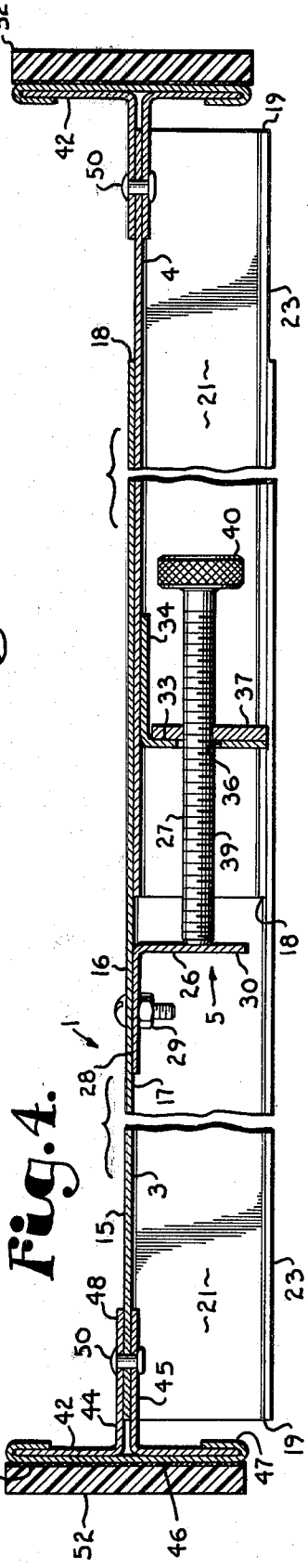

UNIVERSAL ANIMAL SHELF

This invention relates to fixtures for veterinary and laboratory animal cages, and in particular, to a universal length shelf for mounting in the cages.

BACKGROUND OF THE INVENTION

Cages used in holding small animals such as dogs, cats, rabbits, monkeys and the like used for laboratory research and as temporary holding structures for veterinary purposes often employ a shelf extending between the opposite side walls of the cage for animals, particularly cats, to perch on. In the case of felines, a litter box is emplaced on the bottom wall of the cage and a shelf for perching placed an upward distance from the cage bottom.

Heretofore, shelves used in cages were not universal in fit and merely existed of a tray cut to size with an end flange and fastened through existing or otherwise formed hole or bolt patterns in the cage walls. When the shelves and cages were produced by different manufacturers, particular cutting and shaping to size was required and drilling through the cage wall was needed. Thus, fitting shelves was often a difficult and time consuming job even though apparently quite simple at the outset.

OBJECTS OF THE INVENTION

The principle objects of the present invention are: to provide a universal length animal shelf which is adjustable to fit cages of various widths; to provide such an animal shelf which may be emplaced in a cage at any desired height and location from front to rear of the cage; to provide such an animal shelf which quickly converts shelfless cages to cages with shelves therein for use by cats; to provide such an adjustable shelf which is of abuse resistant material; to provide such an animal shelf of a suitable configuration for the comfort of the animal; to provide such an animal shelf having first and second shelf portions which telescopically interfit to provide an adjustable length shelf and have a force-apart mechanism therebetween for urging the opposite end portions of the shelf into engagement with the cage side walls; to provide such an animal shelf having pivotally mounted end plates on the opposite end portions of the shelf to provide a positive facing fit with the opposite side walls of the cage, even on cages with tapered side walls; and to provide such an adjustable length shelf which is relatively inexpensive, sturdy and efficient in use and particularly well adapted for the intended purpose.

Other objects and advantages of this invention will become apparent from the following description taken in connection with the accompanying drawings wherein is set forth, by way of illustration and example, a certain embodiment of this invention.

DESCRIPTION OF THE DRAWINGS

FIG. 1 is a perspective, environmental view of a veterinary or laboratory animal cage having a shelf mounted therein embodying the present invention.

FIG. 2 is a plan view of the adjustable length animal shelf and showing underneath portions thereof in phantom lines FIG. 3 is a cross-sectional view taken along lines 3—3, FIG. 2.

FIG. 4 is a longitudinal sectional view taken along lines 4—4, FIG. 2.

DESCRIPTION OF THE PREFERRED EMBODIMENT

As required, a detailed embodiment of the present invention is disclosed herein, however, it is to be understood that the disclosed embodiment is merely exemplary of the invention which may be embodied in various forms, therefore, specific structural and functional details disclosed herein are not to be interpreted as limiting, but merely as a basis for the claims and as a repesentative basis for teaching one skilled in the art to variously employ the present invention in virtually any appropriately detailed structure.

Referring to the drawings in more detail: The reference number 1 generally indicates an adjustable length shelf embodying the present invention and, FIG. 1, shown emplaced within an animal cage 2. The adjustable length shelf 1 has at least first and second shelf portions 3 and 4 which telescopically interfit and have an adjustment or force-apart means 5 extending between the first and second shelf portions 3 and 4 to urge or spread the shelf portions apart so that the opposite ends thereof snugly engage the opposite walls of the cage 2.

In the illustrated example, the cage 2 is particularly adapted for housing small animals such as dogs, rabbits, cats and the like for laboratory or veterinary purposes and includes a frame 7 connecting adjoining cage structures. Each cage 2 has a top wall 8, bottom wall 9 forming a floor of the cage, and opposite side walls 10 and 11. The walls 8, 9, 10 and 11 are arranged to provide a generally rectangular enclosure closed by a cage door 12 and a back wall 13. In the illustrated example, the cage 2 is of molded fabrication and of a material such as fiberglas or suitable synthetic plastic resin wherein the open interior area of the cage is formed by a male mold member having sloping sides so that the resultant molded member can be pulled therefrom. Therefore, the cage walls 8, 9, 10 and 11 flare outwardly or diverge toward the front of the cage and narrow to the back wall 13.

Each shelf portion 3 and 4 is generally rectangular in cross-section, FIG. 3, and has a relatively wide, such as seven inches, top wall 15 providing an upper surface for an animal to perch. The shelf portions 3 and 4 are comprised of a relatively sturdy material, such as stainless steel for resistance to gnawing abuse by the animals and urine corrosion. Each top wall 15 has upper and lower planar surfaces 16 and 17. Each shelf portion 3 and 4 further has opposite inner and outer ends 18 and 19 with the respective ends 18 telescopically interfitting and the respective ends 19 being free. The shelf portions 3 and 4 each have spaced side walls 20 and 21 extending longitudinally therealong and respectively having inturned flanges 22 and 23 connected thereto. Preferably, the side walls 20 and 21 and flanges 22 and 23 are formed integrally with the top wall 15 of the shelf portions 3 and 4 as by extrusion and bending as by a metal brake or the like.

As clearly depicted in FIG. 3, the second shelf portion 4 has a cross-sectional area less than the cross-sectional area of the first shelf portion 3 for telescoping interconnection of the inner ends 18 of the first and second shelf portions 3 and 4 to provide the adjustable length shelf 1. When telescopically interfitted and downward stress is exerted, as by the weight of the combined shelf portions 3 and 4 and the weight of an animal thereon, the interfitted top walls 15 tend to bind together and exert force upon the respective combined flanges 22 and 23 to maintain structural rigidity of the shelf 1.

The lower area or bottom portion of the shelf 1 is open, FIGS. 3 and 4 for access to the adjustment means or force-apart means 5 which adjusts the extent of the telescoping interfit between the shelf portions 3 and 4 and urges the shelf outer or free ends 19 apart and toward the cage side walls 10 and 11. In the illustrated example, the means 5 includes an abutment block or member 26 attached to one of the shelf portions 3 and 4 and an adjustment screw means 27 mounted to the other of the shelf portions 3 and 4. The adjusment block or member 26 is shown in the form of an angle member having one flange 28 detachably affixed against the lower planar surface 17 of the top wall 15 of the first shelf portion 3 as by bolt and nut fasteners 29. The depending flange 30 extends downwardly of the lower planar surface 17 and terminates upwardly of the spaced flanges 22 and 23 for engagement by the adjustment screw means 27. In the illustrated example, the adjustment block or member 26 is selectively positionable or adjustable in position along the length of the first shelf portion 3. The first shelf portion 3 has a series of bores 31 extending longitudinally therealong and the fasteners 29 are easily removable and connectable to affix the abutment block or member 26 to selective ones of the series of the bores 31 and mount the abutment block or member 26 at selected lengths from the inner end 18 to accomodate variously sized cages.

The adjustment screw member 27 is mounted in a bracket 33 also in the form of an angle having an upper flange 34 secured to the lower planar surface 17 of the second shelf portion 4 as by rivets or the like (not shown). The depending flange 35 has an aperture 36 therethrough substantially centrally positioned and oversized to the adjustment screw means. A threaded nut 37 is secured to the flange 34 so that the bore thereof communicates with the aperture 36. An elongate adjustment screw 39 is threaded through the nut 37 and extends through the aperture 36 and into selective contacting relationship with the flange 30 of the abutment block or member 26 to control the positioning of the abutment block or member 26 relative to the bracket 33. The screw 39 has a knurled head 40 suitable for grasping and manipulation.

For engagement with the cage side walls 10 and 11, the free ends 19 of the respective shelf portions 3 and 4 each have an end plate 42 pivotally mounted thereto. In the illustrated example, each end plate 42 has spaced, oppositely turned, angled portions 44 and 45 joined by a plate member 46 having bent over or turned margins 47 to embrace the outward flanges of the angle portions 44 and 45. The remaining flanges of the angled portions 44 and 45 extend in the form of arms 48 over the ends 19 and a pivotal connection means such as a rivet 50 connects the arms 48 to the respective shelf portion 3 or 4 top wall 15 for pivotal mounting of the end plate 42 thereto. The pivotal mounting of the end plates 42 relative to the shelf portions 3 and 4 permits the end plates 42 to swivel or rotate and engage the cage side walls 10 and 11 in parallel, facing relationship, as for cages with sloping side walls 10 and 11 formed by molding of the cage.

To aid engagement, the plate 46 has a pad 52 of soft rubbery material affixed thereto for gripping engagement with the opposite side walls 10 and 11. Such a suitable material is a synthetic, plastic resinous material available under the trademark Dycem and manufactured by Dycem, Ltd., Bristol, England. The gripping pad 52 may be secured to the plate member 46 by any suitable means such as adhesive or the like and, in the illustrated example, is secured by a double sided sticky tape layer 53.

In the use of the adjustable length shelf, the shelf is positioned as necessary within the cage and the shelf portions 3 and 4 telescoped outwardly or inwardly to generally correspond to the cage interior width. The adjustment screw 39 is rotated until meeting the abutment block or member 26 and rotation is continued until the respective end plates 42 bear forcefully against the side walls 10 and 11 sufficiently to maintain the shelf 1 at the selected position. In position, the resilient, soft pads 52 grippingly engage the surfaces of the side walls 10 and 11 and inhibit slipping or undesired movement of the shelf 1. If necessary, during the setting up phase, the abutment block or member 26 is adjusted longitudinally on the first shelf portion 3 for mounting in selected ones of the series of apertures 31 for properly fitting the shelf 1 to the cage interior.

Removal of the adjustable length shelf 1 from the animal cage 2 is accomplished by mere reversal of the above steps.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. A shelf for an animal cage having opposite wall members and comprising:
   (a) first and second shelf portions telescoped together to provide an adjustable length shelf having opposite free ends;
   (b) an extensible adjustment means having a first portion mounted on said first shelf portion and a second portion mounted on said second shelf portion with said adjustment means including an extensible member extending from said first portion to said second portion for urging said shelf portions apart; and
   (c) opposite end plates respectively mounted to said opposite free ends for facing engagement with the opposite wall members of said cage.

2. The shelf set forth in claim 1 including:
   (a) pivotal means connecting said end plates to said respective free ends for swinging said end plates into substantially horizontal and facing engagement with the opposite wall member of said cage.

3. The shelf set forth in claim 1 including:
   (a) planar pads of soft, rubbery material having an adhesive backing layer respectively affixing said pads to said end plates for gripping engagement with said opposite wall members.

4. A shelf for an animal cage having opposite wall members and comprising:
   (a) first and second shelf portions having upper and lower planar surfaces, spaced sidewalls and inturned flanges extending along said sidewalls;
   (b) said second shelf portion having a cross-sectional area less than the cross-sectional area of said first shelf portion for telescoping interconnection of said first and second shelf portions to provide an adjustable length shelf having opposite free ends;
(c) one of said shelf portions having an abutment member depending from the lower surface thereof;
(d) the other of said shelf portions having a bracket depending from the lower surface thereof and having an adjustment screw extending therethrough and engageable with said abutment member for urging said first and second shelf portions apart;
(e) opposite end plates respectively positioned at said free ends and having arms pivotally connected to said free ends for pivoting movement of said end plates relative to said shelf and facing engagement with the opposite wall members of said cage; and
(f) pads of soft, rubbery material respectively affixed to said end plates for gripping engagement with said opposite wall members and spread-apart retention of said shelf in said cage.

5. A shelf for an animal cage having opposite wall members and comprising:

(a) first and second shelf portions telescoped together to provide an adjustable length shelf having opposite free ends;
(b) an adjustable means having a first portion mounted on said first shelf portion and a second portion mounted on said second shelf portion with said first and second portions adjustable in distance therebetween to urge said shelf portions apart;
(c) opposite end plates respectively mounted to said opposite free ends for facing engagement with the opposite wall members of said cage; and
(d) said adjustment means including an abutment member depending from said first shelf portion;
(e) said adjustment means including a bracket depending from said second shelf portion and having an adjustment screw extending therethrough and engageable with said abutment member for urging said first and second shelf portions apart.

6. The shelf set forth in claim 5 wherein:
(a) said abutment member is adjustable in position on said first shelf portion; said first shelf portion having a series of bores extending longitudinally therealong and having fasteners removably affixing said abutment member to selected ones of said series of bores.

* * * * *